United States Patent [19]

Andrus et al.

[11] Patent Number: 5,153,070

[45] Date of Patent: Oct. 6, 1992

[54] COATED REFRACTORY ARTICLE AND METHOD

[75] Inventors: Ronald L. Andrus, Elmira; John F. MacDowell, Penn Yan, both of N.Y.

[73] Assignee: Corning Incorporated, Corning, N.Y.

[21] Appl. No.: 567,713

[22] Filed: Aug. 1, 1990

[51] Int. Cl.⁵ ................................ B32B 9/00
[52] U.S. Cl. ................. 428/408; 428/367; 428/469; 428/426; 428/428; 428/432; 428/697; 428/698; 428/701; 428/702; 428/427
[58] Field of Search ............... 428/688, 472, 471, 426, 428/432, 704, 698, 702, 428, 427, 701, 699, 408, 697, 469, 367, 368; 501/10, 3, 77, 78, 52, 50

[56] References Cited

U.S. PATENT DOCUMENTS

| | | | |
|---|---|---|---|
| 3,368,712 | 2/1968 | Sanford et al. | 501/10 |
| 3,899,340 | 8/1975 | Malmendier | 501/52 |
| 3,917,488 | 11/1975 | Malmendier | 501/50 |
| 4,140,645 | 2/1979 | Beall et al. | 501/77 |
| 4,147,835 | 3/1979 | Nishino et al. | 428/469 |
| 4,190,500 | 2/1980 | Booth | 501/52 |
| 4,208,605 | 6/1980 | McVey et al. | 428/472 |
| 4,224,074 | 9/1980 | Reade | 501/77 |
| 4,336,153 | 6/1982 | Maries et al. | 501/52 |
| 4,341,849 | 7/1982 | Park et al. | 501/52 |
| 4,358,541 | 11/1982 | Andrus et al. | 501/77 |
| 4,379,195 | 4/1983 | Prabhu et al. | 428/701 |
| 4,385,127 | 5/1983 | Chyung | 501/77 |
| 4,396,720 | 8/1983 | Beall et al. | 501/78 |
| 4,404,290 | 9/1983 | Boudot | 501/78 |
| 4,490,191 | 12/1984 | Hale | 428/698 |
| 4,500,602 | 2/1985 | Patten et al. | 428/408 |
| 4,532,179 | 7/1985 | Takami et al. | 428/469 |
| 4,567,103 | 1/1986 | Sara | 428/408 |
| 4,634,634 | 1/1987 | Kondo et al. | 428/701 |
| 4,666,867 | 5/1987 | Beall et al. | 501/77 |
| 4,689,270 | 8/1987 | Deckelmann | 428/701 |
| 4,692,385 | 9/1987 | Johnson | 428/699 |
| 4,761,323 | 8/1988 | Muhlratzer et al. | 428/408 |
| 4,962,070 | 10/1990 | Sullivan | 428/367 |
| 4,963,441 | 10/1990 | Takai et al. | 428/698 |

Primary Examiner—Ellis P. Robinson
Assistant Examiner—Archene Turner
Attorney, Agent, or Firm—Kees van der Sterre

[57] ABSTRACT

For protection against oxidation or other adverse chemical deterioration, substrates such as carbon, intermetallic aluminides, and refractory metal alloys are provided with barrier coatings of an aluminoborate glass-ceramic coating having a composition, in weight percent, of about 10-55% $Al_2O_3$, 4-40% $B_2O_3$, up to 70% total of RO, wherein RO consists of one or more alkaline earth metal oxides selected in amounts not exceeding the indicated proportions from the group consisting of up to 70% BaO, up to 60% SrO, up to 40% CaO, and up to 25% MgO, up to 35% total of $R_2O$, wherein $R_2O$ consists of one or more alkali metal oxides selected in amounts not exceeding the indicated proportion from the group consisting of up to 35% $Na_2O$, up to 30% $K_2O$, and up to 15% $Li_2O$, up to 25% total of metal oxides selected from the group consisting of ZnO and MnO, up to 30% of $SiO_2$, and up to 10% F.

11 Claims, No Drawings

COATED REFRACTORY ARTICLE AND METHOD

BACKGROUND OF THE INVENTION

The present invention relates to protective glass-ceramic coatings and to refractory structural articles provided with the protective coatings. More specifically, the invention pertains to glass-ceramic coatings useful for the protection of oxidizable refractory substrate materials such as refractory intermetallic aluminides, titanium alloys, carbon-carbon composites, and iron, cobalt or nickel-based superalloys. The coatings provide a chemical barrier which is effective to protect the substrate from oxidation or other physical or chemical deterioration at high temperatures in hostile environments.

There is a continuing need for materials offering good strength and toughness as well as excellent resistance to chemical attack at very high use temperatures. In the aerospace industry, for example, refractory materials such as carbon-carbon composites, superalloys, and intermetallic titanium aluminide compounds are being increasingly used for airframe, engine and other components for supersonic and advanced ultrasonic aircraft such as the national aerospace plane (NASP).

Aluminide intermetallic compounds, which are candidates for large structural components of the space plane, offer a unique combination of low density, high strength, and sustained resistance to temperatures up to 1000° C. However, each of the two aluminide candidate materials presently being evaluated, i.e., titanium aluminide in the gamma form (TiAl) and in the super $\alpha$-2 form ($Ti_3Al$), are susceptible to oxidation attack as well as to hydrogen embrittlement at elevated temperatures.

Carbon is one of the most refractory elements known, with a melting point of over 4000° C., and new composite materials composed of carbon reinforced with carbon fibers offer the highest strength/weight ratios of any known materials. Unfortunately, the reactivity of carbon with oxygen to form $CO_2$ at temperatures below about 600° C. severely limits the usefulness of carbon-based materials in oxidizing environments. The promise of a carbon-carbon composite that could be protected from oxidation to make full use of its high strength/weight ratio and melting point has attracted great interest in the aerospace community.

Protective coatings of silicon carbide, applied by various techniques such as direct solid-state reaction, sputtering, evaporation, or the like, are known to provide limited protection to carbon composite materials at temperatures in the 1000° C. range, but cracking and oxidation remain persistent problems. Boron oxide, alone or in combination with other oxides, has been incorporated in the these substrates and/or the coatings to improve crack resistance, but the resulting materials characteristically melt at low temperatures and lose their effectiveness at temperatures much above 1000° C.

Also benefitting from protective coatings are metallic components composed of the so-called superalloys. These alloys are typically iron-, nickel- or cobalt-based alloys comprising substantial proportions of chromium, iron, cobalt or nickel as alloying constituents. Although more oxidation-resistant than carbon composite materials, these alloys are also subject to high temperature oxidation, and therefore have also been protectively coated for increased high-temperature protection.

A conventional method for protecting refractory materials such as described from oxidation at elevated temperatures is to apply a continuous monolithic glass coating thereto. Glass can completely encapsulate and isolate a protected substrate from the surrounding atmosphere; however, glass layers are subject to erosion or displacement by viscous flow at high temperatures.

The high temperature viscosity of glass coatings may be increased by mixing crystalline materials with the glass frits before application of the coating. However, these glass-crystalline mixtures sinter non-uniformly, and the crystal size, homogeneity, and flow of the coatings are thus very difficult to control.

Polycrystalline ceramic coatings have been proposed as a way to protect superalloy materials from oxidative deterioration. Thus U.S. Pat. Nos. 4,485,151 and 4,535,033 (Stecura) describe the application of insulating layers of stabilized $ZrO_2$ to such materials via a plasma-spraying technique.

Ceramic plasma spraying procedures can involve several steps that are tedious and difficult to control in commercial production. Further, thermal gradients tend to develop during plasma-spraying which introduce defects in the finished coating, and the finished coatings tend to be porous. This permits access of gases, in particular $O_2$, $H_2$, $SO_2$, and water vapor, all of which can contribute to coating failure.

Glass-ceramic materials are of course well known and a wide variety of glass-ceramic compositions for various uses, including coatings, has been developed. U.S. Pat. No. 3,397,076 (Little et al.), for example, describes fused crystallizable ground and cover coats for high temperature alloys in which the major elements are cobalt, nickel, chromium, iron or mixtures. The ground coat is lithium-free and contains 35-65% $SiO_2$ and 12-45% BaO. Examples also contain substantial amounts of $R_2O$, $B_2O_3$ and/or $TiO_2$.

U.S. Pat. No. 3,467,534 (MacDowell) discloses glass-ceramic articles consisting essentially of 20-70% BaO and 30-80% $SiO_2$ and having a barium silicate principal crystal phase. A preferred example is described as considered for coating metals. U.S. Pat. No. 4,861,734 (MacDowell) discloses alkaline earth aluminoborate glass-ceramics, produced through a process of sintering finely-divided borate glasses of appropriate composition, which exhibit relatively high levels of crystallinity and dielectric properties rendering them suitable for applications such as integrated circuit packaging.

Notwithstanding the fact that both glass-ceramic and glass coating technologies are highly developed, there remains a need for new protective coating formulations which could protect refractory carbonaceous, metallic, and intermetallic surfaces from oxidation or other deterioration at high temperatures. It is accordingly a principal object of the present invention to provide protective coatings of improved integrity and refractoriness for use in the protection of such substrates.

Another object is to provide such coatings which are both more effective than previously known coatings and more convenient to apply.

A further object is to provide protective coatings which are non-porous, continuous and free from defects such as pinholes and cracks, and thus a barrier to the diffusion of oxygen as well as hydrogen and other corrosive gases.

A still further object is to provide a barrier coating that adheres tightly to various refractory substrates and resists spalling during thermal cycling.

Another object is to provide an oxygen barrier coating material that exhibits the excellent flow characteristics of a glass coating as it is fired in one temperature range, and becomes resistant to flow (due to crystallization) as it is heated in a higher temperature range.

A further object is to provide a protectively coated article comprising a substrate portion composed of a carbon composite, intermetallic or metal alloy and a protective glass-ceramic coating offering improved resistance to mechanical abrasion and chemical corrosion, adherence, refractoriness, integrity and/or permeation resistance than prior art coatings.

SUMMARY OF THE INVENTION

We have now identified a family of aluminoborate glasses which provide excellent flow, good substrate coverage, desirable crystallization behavior, and a crystallized glass-ceramic coating of high density and low permeability for the protection of refractory substrates. The glass-ceramic coatings can be selected to provide excellent integrity and adherence to oxidizable refractory inorganic substrates, including substrates such as the intermetallic aluminides, metal alloys, and carbon-based materials such as carbon composites. Examples of particular substrates include carbon-fiber-reinforced carbon matrix composites, titanium aluminides, titanium alloys, and nickel-based, iron-based, and cobalt-based superalloys.

A primary concern with respect to borate-based glass-ceramics relates to the relatively large proportions of $B_2O_3$ present, and to the resulting residual low-melting glass phases expected in crystallized articles produced from such compositions. Hence borate glass-ceramics are not attractive candidates for high-temperature applications, since the estimated maximum use temperatures were far below the 1000° C. capabilities thought to be required to achieve significant improvements in refractory substrate protection.

Surprisingly, the present invention includes aluminoborate glass-ceramic compositions that can form smooth, adherent, spall-free coatings capable of withstanding temperatures of 1000° C. and higher for prolonged periods. Also included are compositions providing coatings offering improved flow, adherence and other properties at temperatures below 1000° C. Further, refractory aluminoborate coatings within the composition range of the invention can be formulated for compatibility with a number of refractory substrates, including, for example, carbon-carbon composites, iron, nickel, and cobalt-based superalloys, and titanium aluminides.

The invention thus comprises, in broad aspect, a refractory substrate material composed of a carbon, aluminide or metallic alloy material as above described upon which is provided at least one surface barrier layer comprising or consisting of a protective aluminoborate glass-ceramic coating. Aluminoborate glass compositions useful for the application of glass-ceramic coatings in accordance with the invention will consist essentially, in weight percent, of about 10-55% $Al_2O_3$, 4-40% $B_2O_3$, up to 70% total of RO, wherein RO consists of one or more alkaline earth metal oxides selected in amounts not exceeding the indicated proportions from the group consisting of up to 70% BaO, up to 60% SrO, up to 40% CaO, and up to 25% MgO, up to 35% total of $R_2O$, wherein $R_2O$ consists of one or more alkali metal oxides selected in the indicated proportion from the group consisting of up to 35% $Na_2O$, up to 30% $K_2O$, and up to 15% $Li_2O$, up to 25% total of metal oxides selected from the group consisting of ZnO and MnO, up to 30% of $SiO_2$, and up to 10% F.

In another aspect, the invention comprises a method for the protection of a refractory substrate from oxidation or other chemical attack. That method comprises the steps of applying a glass coating directly or indirectly to the substrate, and thereafter heating the glass coating, typically by heating the glass and substrate, to promote crystallization (thermal curing) of the glass coating. In a preferred embodiment, the glass coating is applied to the substrate as a glass powder. The method of the invention provides a continuous protective crystalline or semi-crystalline glass-ceramic coating on the substrate.

Glass compositions within the above described composition region can be melted and converted to glass powders by conventional glass processing methods, and can be applied in powder form to selected refractory substrates to produce coatings of any selected thickness. Powder coatings thus provided can then be sintered as glasses, typically at temperatures well below 900° C., and thereafter crystallized by firing under an appropriate atmosphere at temperatures in the range of about 900°–1100° C. The resulting glass-ceramic coatings will generally be highly crystalline, dense and continuous, as well as spall- and crack-resistant on substrates of appropriate chemical reactivity and thermal expansion characteristics.

The present coatings offer significant and unexpected advantages over prior art coatings, not only with respect to reduced curing temperatures, but also in terms of coating behavior. Because crystallization in these coatings tends to be somewhat delayed in comparison with prior art silicate coatings, flow during curing is more extensive, and better coating coverage can be achieved. In addition, typical concentrations of residual glass are high enough to impart a self-healing quality to the coatings, yet the glass-crystalline mixture is sufficiently hard or refractory overall that the service temperature of the coatings is not unduly compromised.

In many cases, the protective glass-ceramic coatings of the invention will be used in combination with other coatings to provide a fuller range of substrate protection and performance. In the case of carbon-carbon composites, for example, a primer or base coating of silicon carbide or a similar material is highly desirable in order to provide a substrate or foundation for overcoating with aluminoborate glass-ceramic coatings of the invention. In other cases, semi-crystalline or crystalline overcoatings may be used in combination with the glass-ceramic coatings of the invention to provide a coating system of particularly high refractoriness and durability.

DETAILED DESCRIPTION

An important performance characteristic of any glass-ceramic coating system is an appropriate balance between adequate viscous flow and densification of the glass during the early firing stages and crystallization of the coating prior to completion of the firing cycle. Premature crystallization results in insufficient flow and a rough, porous coating, whereas insufficient crystallization results in excess quantities of residual glass and thus a less refractory coating. The present compositions generally achieve excellent balance between early stage viscous flow and high cured crystallinity.

Also important is the thermal expansion match between the coating and the substrate. Although in some instances the expansion of the coating will be modified by interaction with the substrate during curing, carbon substrates will generally require coatings of relatively low thermal expansion while metal alloys and intermetallic aluminides will require relatively high expansion coatings. Again, the coatings of the invention can be adjusted for thermal expansion, and can provide final coatings which are well matched to either type of substrate in terms of physical properties.

As previously noted, the preparation of glass powders from the aluminoborate glasses utilized to form the coatings can follow conventional practice. The glasses are compounded of conventional glass batch constituents, typically oxides of the selected metals, and then mixed and melted at temperatures typically in the range of 1500°–1700° C. to provide homogeneous fluid melts. The melts are then converted into granular glass by drigaging or other fritting method, and the granular pre-product is then milled to provide fine glass powder. The preferred particle sizes of the milled glass are typically in the 5–20 micron range, although smaller particle sizes may be preferred where very thin coatings are required.

The surface of a selected refractory substrate to be protected may be coated with the powdered glass in any conventional manner. The presently preferred method is electrostatic spraying, wherein electrostatically-charged, dry glass powder is sprayed with a high degree of uniformity onto the surface of the selected substrate while the latter is supported on an oppositely charged wire mesh screen. Alternatively, the powdered glass may be mixed with a suitable medium, e.g., water or an organic vehicle, applied uniformly over the surface of the substrate, and dried.

The glass powder-coated substrate is then typically heated to a temperature in the range of 800°–1100° C. At these temperatures, the glass particles initially soften and flow to produces a dense, smooth, well-formed continuous glass coating that is essentially free from crystallization. Further heating, within the same or a higher temperature range, is effective to initiate and then complete the development of crystal phases to form a dense, strong, refractory, crystalline or semi-crystalline coating.

The invention may be further illustrated by specific examples of aluminoborate glass-ceramic coating compositions useful in accordance with the invention as set forth in Table I below. The compositions are reported on a parts by weight basis, but closely approximate weight percent. These formulations, which are particularly suitable for use for the protection of aluminide intermetallic and/or metal alloy substrates, can yield smooth, non-porous coatings that adhere well to these substrates.

TABLE I

Aluminoborate Glass-Ceramic Coating Compositions

| Sample No. | BaO | SrO | CaO | MgO | $Al_2O_3$ | $B_2O_3$ | $SiO_2$ | Other |
|---|---|---|---|---|---|---|---|---|
| 1 | 56.0 | — | — | — | 18.6 | 25.4 | — | — |
| 2 | 50.4 | — | — | — | 16.8 | 22.9 | 9.9 | — |
| 3 | 57.0 | — | — | — | 18.9 | 12.9 | 11.1 | — |
| 4 | 55.4 | — | — | — | 12.3 | 25.1 | 7.2 | — |
| 5 | 66.5 | — | — | — | 14.7 | 10.1 | 8.7 | — |
| 6 | 61.2 | — | — | — | 13.6 | 9.3 | 16.0 | — |
| 7 | — | 54.7 | — | — | 26.9 | 18.4 | — | — |
| 8 | — | 47.2 | — | — | 23.2 | 15.9 | 13.7 | — |
| 9 | — | 57.3 | — | — | 18.8 | 12.8 | 11.1 | — |
| 10 | — | — | 32.6 | — | 29.7 | 20.2 | 17.5 | — |
| 11 | — | — | 35.8 | — | 32.5 | 22.2 | 9.6 | — |
| 12 | 42.0 | — | — | 11.0 | 27.9 | 19.1 | — | — |
| 13 | 38.8 | — | — | 10.2 | 25.8 | 17.6 | 7.6 | — |
| 14 | 35.3 | — | — | 9.3 | 23.5 | 32.0 | — | — |
| 15 | 28.6 | — | — | 7.5 | 38.0 | 25.9 | — | — |
| 16 | 32.9 | — | — | 17.3 | 21.9 | 15.0 | 12.9 | — |
| 17 | — | — | — | 10.7 | 27.1 | 37.1 | — | 25.1 $K_2O$ |
| 18 | 38.7 | — | — | — | 25.8 | 17.6 | — | 17.9 MnO |
| 19 | 37.7 | — | — | — | 25.1 | 17.1 | — | 20.0 ZnO |
| 20 | — | 19.6 | — | — | 38.6 | 26.4 | — | 15.4 ZnO |
| 21 | 26.0 | — | — | — | 34.5 | 23.6 | — | 15.9 $K_2O$ |
| 22 | — | — | — | 9.1 | 45.8 | 31.2 | — | 13.9 $Na_2O$ |
| 23 | — | — | — | — | 41.9 | 28.6 | — | 12.7 $Na_2O$ 16.7 ZnO |
| 24 | — | — | 25.2 | — | 45.8 | 15.6 | 13.4 | — |
| 25 | — | 21.0 | 11.4 | — | 41.4 | 14.1 | 12.2 | — |
| 26 | 28.3 | — | 10.3 | — | 37.6 | 12.8 | 11.0 | — |
| 27 | 30.5 | — | 11.0 | — | 40.1 | 6.8 | 11.8 | — |
| 28 | — | — | 23.8 | — | 43.3 | 7.4 | 25.5 | — |
| 29 | — | — | 22.0 | — | 53.3 | 9.1 | 15.7 | — |
| 30 | — | 23.9 | 12.9 | — | 47.1 | 16.1 | — | — |
| 31 | 31.8 | — | 11.6 | — | 42.2 | 14.4 | — | — |
| 32 | 56.0 | — | — | — | 18.6 | 25.4 | — | 6.0 F |
| 33 | 66.5 | — | — | — | 14.7 | 10.1 | 8.7 | — |
| 34 | — | — | 28.4 | — | 38.8 | 17.6 | 15.2 | — |
| 35 | 52.9 | — | — | — | 35.2 | 12.0 | — | — |
| 36 | 47.9 | — | — | — | 31.9 | 10.9 | 9.4 | — |
| 37 | 17.8 | 12.0 | 6.5 | — | 39.0 | 13.3 | 11.5 | — |
| 38 | — | 40.9 | — | — | 40.3 | 6.9 | 11.9 | — |
| 39 | 50.6 | — | — | — | 33.7 | 5.7 | 9.9 | — |
| 40 | 27.6 | 18.6 | — | — | 36.7 | 6.3 | 10.8 | — |
| 41 | — | 36.6 | — | — | 36.0 | 6.1 | 21.2 | — |

TABLE I-continued

| Sample No. | Aluminoborate Glass-Ceramic Coating Compositions Oxide | | | | | | | |
|---|---|---|---|---|---|---|---|---|
| | BaO | SrO | CaO | MgO | $Al_2O_3$ | $B_2O_3$ | $SiO_2$ | Other |
| 42 | — | — | 28.4 | — | 38.8 | 17.6 | 15.2 | — |

To prepare glass powders from the compositions reported in Table I, glass batches of corresponding oxide composition are mixed and melted in platinum crucibles at about 1600° C. for two hours. The glass melts thus obtained are then poured into water to quench and granulate the glass. The granular glass (drigage) is thereafter ball milled with alumina cylinders for 4 to 8 hours to provide powdered glass with an average particle size of about 10 micrometers.

The crystallization behavior of glasses of the above composition is evaluated by dry pressing the powdered glasses into cylinders ½" in diameter and heat-treating the cylinders at temperatures of 800°–1200° C. for ½–1 hour to determine their sintering characteristics. To determine the thermal expansion coefficients and densities (porosities) of the glass-ceramic products, 4"×¼"×¼" bars are pressed from the powdered glass, sintered, and crystallized to glass-ceramics.

In many cases X-ray diffraction analyses are conducted on fired samples to determine crystal phases developed during firing. In general these analyses reveal alkaline earth aluminate or aluminoborate phases or, if silica is present, alkaline earth aluminosilicate phases.

Coatings of the compositions shown in Table I are also applied to aluminide or metal alloy coupons to confirm the compatibility of the glass and glass-ceramic coating materials with these particular substrates. The specific substrate materials tested include gamma-titanium aluminide (TiAl), super alpha-2 titanium aluminide ($Ti_3Al$), and Inconel 718 alloy.

The coatings are applied in thicknesses between 20 and 100 micrometers to coupons of 2 mm thickness using electrostatic spraying. The surfaces of the coupons are cleaned and grit-blasted prior to coating. Each glass-coated coupon is then fired at an appropriate peak temperature, typically 900°, 1000°, or 1100° C., in an air or flowing helium (low-oxygen) atmosphere. The samples are placed in the firing furnace at ambient temperature, heated to the selected peak firing temperature at a furnace heating rate of approximately 75° C. per minute, and maintained at the peak firing temperature for about one hour.

Illustrative results from evaluations such as described above as conducted on Inconel 718 alloy substrates are reported in Table II below. The sample numbers in Tables I and II correspond for cross reference. Included in Table II for each of the Table I compositions tested are the peak heat treatment temperature, glass-ceramic density, and thermal coefficient of expansion (TCE) data as determined on pressed crystallized bars, and crystal phase descriptions where determined on individual samples. Also included are descriptions of the appearance of each glass-ceramic coating on the alloy substrates. Most of the firings onto alloy substrates were conducted in a low oxygen (flowing helium) atmosphere to prevent excessive oxidation prior to coating consolidation.

The expansion coefficients and densities given in Table II are those obtained on pressed and fired bars. As previously noted, reaction of the coating with the oxide surface of the substrate during firing will substantially alter the composition of the coating in the interfacial region, altering the thermal expansion and density of the coating in that region as well.

As the coating descriptions indicate, small seed and pinhole defects are observed in some of the coatings, particularly if very thin, but no spalling of the coatings is observed. The pinhole defects may of course be avoided by better sample preparation and/or the use of thicker coatings.

TABLE II

| Sample No. | Aluminoborate Glass-Ceramic Coatings on Alloy Substrates | | | |
|---|---|---|---|---|
| | Heat Treatment (1 hr. in He)/ Appearance | TCE | Density | Phases |
| 1 | 900° very smooth/glossy dark grey-green | 86.6 | 3.619 | |
| 2 | 900° slightly rippled semigloss grey | 85.9 | 2.555 | ($BaAl_2Si_2O_8$) |
| 3 | 900° semigloss dark grey opaque/rippled | 93.0 | 3.627 | $BaAl_2Si_2O_8$ |
| 4 | 900° dark grey semigloss/ slightly dimpled | | | ($BaB_2O_4$) |
| 4 | 1000° grey-green semigloss | | | |
| 5 | 900° glossy dark grey opaque/rippled | 102.5 | 4.070 | |
| 6 | 1000° semigloss/thin/ pinholes | 97.3 | 3.779 | $BaAl_2Si_2O_8$ |
| 7 | 900° very dark grey-green/ glossy & smooth | | 3.432 | $SrAl_2O_4$ |

TABLE II-continued

Aluminoborate Glass-Ceramic Coatings on Alloy Substrates

| Sample No. | Heat Treatment (1 hr. in He)/ Appearance | TCE | Density | Phases |
|---|---|---|---|---|
| 8 | 900° translucent/grey/ semigloss/few pinholes | 75.1 | 3.188 | $SrAl_2Si_2O_8$ |
| 9 | 900° dark grey opaque/ semigloss/rippled | 86.9 | 3.556 | $Sr_2Al_2B_2O_7$ |
| 10 | 900° very smooth semigloss translucent grey | 65.0 | 2.517 | $\alpha\text{-}CaAl_2B_2O_7$ |
| 11 | 900° thick/glossy/ translucent grey | 55.7 | 2.255 | $\alpha\text{-}Ca_2Al_2B_2O_7$ |
| 12 | 900° very smooth dark grey semigloss | 90.3 | 3.554 | $MgAl_2O_4$ |
| 13 | 900° smooth glossy/light grey/some pinholes | 74.2 | 3.255 | $BaAl_2Si_2O_8$ |
| 14 | 900° smooth/dull grey/ some pinholes | 78.3 | 2.534 | — |
| 15 | 900° blue-grey semigloss/ rippled surface | 65.6 | 2.925 | (mullite) |
| 16 | 900° grey glossy/slightly rippled/few pinholes | 101.6 | 3.219 | $BaAl_2Si_2O_8$ |
| 17 | 900° white opaque thick/ glossy | 107.4 | 2.253 | $MgAl_2O_4$ |
| 18 | 900° glossy/very fine blisters | 87.7 | 3.428 | |
| 19 | 900° smooth grey semigloss | 92.5 | 3.344 | $Ba_8Al_2O_{11}$ |
| 20 | 900° glossy light blue/ slightly textured | 62.2 | 2.631 | $ZnAl_2O_4$ |
| 21 | 1000° seedy/translucent/ lumpy | 73.9 | | |
| 22 | 1000° very hard/grey-brown/ surface blister | 94.3 | | $MgAl_2O_4$ |
| 23 | 1000° very hard/grey-brown/ surface blisters | 91.4 | | $ZnAl_2O_4$ |
| 24 | 1000° rough/translucent/ lumpy/hard | 71.2 | 2.463 | $CaAl_2Si_2O_8$ |
| 25 | 1000° rough/translucent/ lumpy/hard | 67.1 | 2.872 | slawsonite |
| 26 | 1000° hard/translucent/ pinholes | 82.0 | 3.036 | $(Ba,Ca)Al_2Si_2O_8$ (Hex.) |
| 27 | 1000° translucent/lumpy | 80.5 | | |
| 28 | 1000° transparent/translucent crystals/hard/smooth/ pinholes | 63.1 | 2.741 | $CaAl_2Si_2O_8$ |
| 29 | 1000° clear/hard/transparent and translucent/ few pinholes | 69.4 | 2.767 | $CaAl_2Si_2O_8$ |

Evaluations similar to those conducted on metal alloy substrates were also conducted on titanium aluminide substrates. The coating procedures followed were similar to the procedures utilized to apply the coatings to alloys as described above. In general, however, firing of the coatings onto $Ti_3Al$ substrates was carried out in air, while the coatings on TiAl were carried out in a low-oxygen atmosphere (flowing helium).

Table III below reports the results of a number of coating evaluations on titanium aluminides. Included in Table III for each of the coatings tested are an identification of the substrate (Subs.) composition, a report of the heat treatment atmosphere and peak temperature used, and the appearance of the fired coating. Again, the Sample numbers used in Table III correlate with the original Sample numbers defined in Table I above. Also included in Table III are the thermal expansion coefficients, densities, and crystal phases present in the coatings, where determined on individual samples.

TABLE III

Aluminoborate Glass-Ceramic Coatings on Ti—Al Substrates

| No. | Subs. | Heat Treatment (°C./1 hr) | Appearance |
|---|---|---|---|
| 11 | Ti₃Al | 900/Air | thin/flat/finely textured black |
| 12 | Ti₃Al | 900/Air | transparent/very fine seed |
| 15 | TiAl | 900/He | smooth/translucent grey/few pinholes |
| 17 | Ti₃Al | 900/Air | clear transparent/white crystals |
| 19 | Ti₃Al | 900/Air | glossy grey/some pinholes |
| 25 | TiAl | 1000/He | hard/smooth/translucent/few pinholes |
| 25 | TiAl | 1100/He | rough translucent/white & yellow |
| 26 | TiAl | 1000/He | smooth transl./small blisters-pinholes |
| 27 | TiAl | 1000/He | hard/thin/rough texture |
| 28 | TiAl | 1000/He | hard/rough/transl. grey/white crystals |
| 30 | TiAl | 1000/He | transparent-translucent crystals/hard |
| 31 | TiAl | 1000/He | transparent-translucent crystals/hard |
| 32 | Ti₃Al | 900/Air | very thin glassy/"puddling" of excess |
| 32 | TiAl | 900/He | very smooth transparent/appears black |
| 33 | Ti₃Al | 900/Air | smooth/transparent/appears black |
| 35 | TiAl | 1100/He | hard/rough grey translucent |
| 36 | TiAl | 1000/He | smooth transparent/slightly seedy |
| 37 | TiAl | 1000/He | seedy/transparent-translucent/fine blisters |
| 38 | TiAl | 1000/He | very thin/rough/transparent |
| 39 | TiAl | 1000/He | thin/rough/transparent |
| 40 | TiAl | 1000/He | hard/thin/rough texture |
| 41 | TiAl | 1000/He | transparent-translucent/rough texture |
| 42 | TiAl | 900/He | very smooth grey/transparent/fine seed |

| Sample No. | Thermal Expansion (× 10⁻⁷/°C.) | Density (g/cc) | Phases Present (XRD) |
|---|---|---|---|
| 11 | 55.7 | 2.255 | α-CaAl₂B₂O₇ |
| 12 | 90.3 | 3.554 | MgAl₂O₄ |
| 15 | 65.6 | 2.925 | mullite |
| 17 | 107.4 | 2.253 | MgAl₂O₄ |
| 19 | 85.7 | 2.994 | ZnAl₂O₄ |
| 25 | 67.1 | 2.872 | — |
| 25-(1100° C.) | 67.2 | — | — |
| 26 | 82.0 | 3.036 | (Ba,Ca)Al₂Si₂O₈(Hex.) |
| 27 | 80.5 | 3.073 | — |
| 28 | 63.1 | 2.714 | CaAl₂Si₂O₈ |

TABLE III-continued

Aluminoborate Glass-Ceramic Coatings on Ti—Al Substrates

| 30 | 51.7 | 2.934 | — |
|---|---|---|---|
| 31 | 83.2 | 3.296 | — |
| 32-(Ti₃Al) | 86.6 | 3.619 | — |
| 33 | 102.5 | 4.070 | — |
| 35 | 85.8 | 3.121 | — |
| 36 | — | 3.364 | BaAl₂Si₂O₈(Hex.) |
| 37 | 54.6 | 2.967 | (Ba,Sr,Ca)Al₂Si₂O₈ (Hex.) |
| 38 | 67.7 | 3.173 | — |
| 39 | 69.6 | 3.521 | — |
| 40 | 75.9 | 3.285 | — |
| 41 | 54.3 | 3.069 | CaAl₂Si₂O₈ |
| 42 | 64.0 | 2.669 | — |

Specific examples of aluminoborate glass-ceramic coating compositions which are particularly useful in accordance with the invention for the protection of carbon-carbon composite substrates are set forth in Table IV below. The compositions in Table IV are again reported on a parts by weight basis in approximate weight percent.

TABLE IV

Aluminoborate Glass-Ceramic Coating Compositions for C-C Composites

| No. | B₂O₃ | Al₂O₃ | SiO₂ | MgO | CaO | SrO | BaO | Other |
|---|---|---|---|---|---|---|---|---|
| 43 | 25.3 | 37.1 | — | — | — | 37.6 | — | — |
| 44 | 23.2 | 34.0 | — | — | — | 17.3 | 25.6 | — |
| 45 | 28.6 | 41.9 | — | 8.3 | — | 21.3 | — | — |
| 46 | 31.7 | 46.4 | — | 9.1 | 12.7 | — | — | — |
| 47 | 17.6 | 51.6 | — | — | 7.1 | — | — | 23.6 Na₂O |
| 48 | 17.8 | 52.1 | — | — | 14.3 | — | — | 15.8 Na₂O |
| 49 | 13.7 | 50.1 | 11.8 | — | — | — | — | 24.4 Na₂O |
| 50 | 17.7 | 51.8 | 15.2 | — | — | — | — | 15.2 Li₂O |
| 51 | 17.5 | 51.3 | — | — | — | — | — | 31.2 Na₂O |
| 52 | 12.0 | 35.2 | — | — | — | — | 52.8 | — |
| 53 | 13.1 | 38.4 | — | — | — | 19.5 | 28.9 | — |
| 54 | 10.1 | 29.5 | — | — | 16.2 | — | 44.3 | — |
| 55 | 10.8 | 31.7 | — | — | — | 32.2 | — | 25.3 ZnO |
| 56 | 14.5 | 42.4 | — | — | — | 43.1 | — | — |
| 57 | 12.9 | 37.7 | 11.1 | — | — | 38.3 | — | — |
| 58 | 7.4 | 43.3 | 25.5 | — | 23.8 | — | — | — |
| 59 | 15.8 | 46.2 | — | — | 38.1 | — | — | — |
| 60 | 11.9 | 34.9 | — | — | — | 53.2 | — | — |
| 61 | 9.5 | 27.8 | — | — | — | — | 62.7 | — |
| 62 | 4.0 | 26.9 | 7.9 | — | — | — | 60.6 | — |
| 63 | 5.2 | 30.5 | 17.9 | — | — | 46.4 | — | — |

Glass powders having the compositions reported in Table IV can be prepared in the same manner as described above for the aluminoborate glass-ceramics reported in Table I. Again, the crystallization behavior of the glasses is evaluated from dry-pressed pellets crystallized at 800°-1200° C., and expansion and density data are determined from the pellets and/or glass-ceramic bars prepared by pressing, sintering and crystallizing the powders.

As with the previous aluminoborate formulations, the coating compositions in Table IV will provide dense glass-ceramic coatings when applied as powdered glass layers to carbon composite surfaces. However, our data clearly indicate a need to use an adherent base coating as a support and bonding medium for the protective aluminoborate glass-ceramic layer. The base coating will most preferably consist of a metal carbide that can develop a strong bond between the carbon-carbon composite material and the aluminoborate glass-ceramic overcoat. A particular illustrative example of such a coating is silicon carbide.

Coatings of the compositions shown in Table IV above, as well as additional coatings having compositions selected from Table I, are applied to coupons of carbon-carbon composite material to evaluate coating quality and adherence. The coupons were in each case provided with solid state reacted silicon carbide primer coats to insure good adherence of the protective aluminoborate glass-ceramic coatings.

The glass-ceramic coatings were applied in thicknesses of 20-200 micrometers to coupons of 2 mm thickness using electrostatic spraying. Each glass-coated coupon is then fired at a peak temperature of 900° to 1100° C. in a low-oxygen atmosphere (typically flowing helium). Again, the samples are placed in the firing furnace at ambient temperature, heated to the selected peak firing temperature at a furnace heating rate of approximately 75° C. per minute, and maintained at the peak firing temperature for about one hour.

Coating results obtained from the described testing procedure are reported below in Table V. The Sample numbers reported in Table V correspond to the Sample numbers for the coating compositions reported in Tables I and IV.

Included in Table V for each of the coatings tested are the peak heat treatment temperature used and the resulting appearance of the glass-ceramic coating. The resulting transparency of each coating is also reported. For selected samples, thermal expansion coefficient (TCE) data were generated as well.

As the coating descriptions indicate, some blister and pinhole defects are observed in some of the coatings, but no spalling of the coatings is observed. The pinhole defects may of course be avoided by better sample preparation and/or the use of thicker coatings. The complete absence of cracking in many of the examples is particularly surprising in view of the rather large difference in thermal expansion between some of the coatings and the carbon-carbon composite substrate used, the latter having an average TCE of about 30 ($\times 10^{-7}$/°C.).

TABLE V

Aluminoborate Glass-Ceramic Coatings on Carbon Substrates

| No. | Heat Treatment (°C. for 1 hour) Appearance | XRD | TCE ($10^7$/°C.) |
|---|---|---|---|
| 1 | 900 <br> v. thin transparent/seed/no spalling or cracks | | 86.6 |
| 5 | 900 <br> v. thin transparent/seed/no spalling or cracks | | 102.5 |
| 7 | 900 <br> v. thin transparent coating/blisters/no spalling or cracks | | — |
| 12 | 900 <br> cl. transparent/blisters/pinholes/no spalling or cracks | | 90.3 |
| 15 | 900 <br> slt. transparent-translucent/crystals/pinholes/ no spalling or cracks | | 65.6 |
| 43 | 900 <br> cl. transparent-translucent/smooth/no spalling or cracks | | 8.3 |
| 44 | 900 <br> translucent/v. seedy/large voids/no spalling or cracks | | — |
| 44 | 1000 <br> glossy/transparent/seedy | | — |
| 45 | 900 <br> translucent white/smooth/few pinholes/ no spalling or cracks | | — |
| 46 | 900 <br> hazy translucent/pinholed/no spalling or cracks | | — |
| 47 | 1000 <br> v. thin cl. transparent/white lumps/no spalling v. slt. cracking | | 94.5 |
| 48 | 1000 <br> v. thin cl. transparent/hazy lumps/no spalling v. slt. cracking | | 74.7 |
| 49 | 1000 <br> v. thin cl. transparent/cl. lumps/no spalling v. slt. cracking | | 137.4 |
| 50 | 1000 <br> v. thin cl. transparent/blue-white lumps no spalling/v. slt. cracking | | — |
| 51 | 1000 <br> v. thin glassy transparent with lumps & ridges/ no spalling or cracking | | — |
| 52 | 1000 <br> clear translucent, v. porous | $BaAl_2O_4$ | 84.0 |
| 52 | 1100 <br> clear translucent, adherent, no cracks | $BaAl_2O_4$ | 84.0 |
| 53 | 1000 <br> lt. cracking, clear, translucent, seedy | $BaAl_2O_4$ | 83.0 |
| 53 | 1100 <br> translucent, fused, adherent, lt. cracks | $BaAl_2O_4$ | — |

TABLE V-continued

Aluminoborate Glass-Ceramic Coatings on Carbon Substrates

| No. | Heat Treatment (°C. for 1 hour) Appearance | XRD | TCE ($10^{-7}/°C.$) |
|---|---|---|---|
| 54 | 1000 clear, transparent, thin, few v.f. cracks | — | — |
| 55 | 1000 rough, clear, transparent, no cracks | — | — |
| 56 | 1100 clear, transparent, filled SiC cracks | $SrAl_4O_7$ ($SrAl_2B_2O_7$) | 73.7 |
| 57 | 1000 clear, transparent, seedy, ridges | $\beta$-$SrAl_2B_2O_7$ | 51.4 |
| 58 | 1100 clear, transparent-translucent, lumpy | $CaAl_2Si_2O_8$ | 64.8 |
| 59 | 1100 clear, transparent-translucent, seedy | $CaAl_4O_7$ | — |
| 60 | 1000 clear, transparent-translucent, v. thin, no cracks | $SrAl_2O_4$ | 89.4 |
| 60 | 1100 clear, rough, few seeds and voids, no cracks | — | — |
| 61 | 1000 clear, transparent-translucent, v. thin, no cracks | $BaAl_2O_4$ | |
| 62 | 1100 transparent, lumpy, few seeds, no cracks | $BaAl_2O_4$ | |
| 63 | 1000 clear, transparent, seedy | $SrAl_2Si_2O_8$ | 65.6 |

In some cases, aluminoborate coatings provided in accordance with the invention may comprise significant quantities of the alkali metal ions ($K^+$, $Na^+$, $Li^+$). Although these had been expected to cause some long-term instabilities in coatings designed for high-temperature use, sodium and lithium aluminoborates were surprisingly successful as coatings when fired at 1000° C. for one hour. In addition to good flow and adherence to the SiC undercoat, the alkali aluminoborate coatings showed little or no cracking after firing.

Nevertheless, for applications wherein high refractoriness is of particular importance, the preferred coatings in accordance with the invention will be those which are substantially free of the alkali metal oxides. In these cases, alkali-free compositions wherein the boron content is kept within the lower portion of the permissible range, i.e., in the range of about 4-25% $B_2O_3$ by weight, will be particularly refractory.

It may also be useful for some applications to limit the level of silicate phase development, since such development can result in the formation of boron domains in the coating which tend to be of somewhat reduced chemical stability. For these purposes, silica-free compositions, or compositions containing not more than about 15% of silica by weight, are especially useful.

As previously noted, there are applications for refractory carbon composite, titanium aluminide and alloy components of the kind herein described which will require extended use above 1100° C. Although perhaps not sufficient alone for long service at these temperatures, the aluminoborate glass-ceramic coatings of the invention are adaptable to such use if employed in combination with an overcoating of one or more refractory ceramic materials. Examples of such overcoating materials might include cordierite ($2MgO.2Al_2O_3.5SiO_2$), alkaline earth aluminosilicates, alpha-alumina, $ZrO_2$, or the like.

While the invention has been particularly described above with respect to specific materials and specific procedures, it will be recognized that those materials and procedures are presented for purposes of illustration only and are not intended to be limiting. Thus numerous modifications and variations upon the compositions and processes specifically described herein may be resorted to by those skilled in the art within the scope of the appended claims.

We claim:

1. An article of manufacture comprising a substrate formed of an oxidizable refractory inorganic material upon which is disposed at least one surface barrier layer, the surface barrier consisting essentially of an aluminoborate glass-ceramic coating having a composition, in weight percent, of about 10-55% $Al_2O_3$, 4-40% $B_2O_3$, up to 70% total of RO, wherein RO consists of one or more alkaline earth metal oxides selected in amounts not exceeding the indicated proportions from the group consisting of up to 70% BaO, up to 60% SrO, up to 40% CaO, and up to 25% MgO, up to 35% total of $R_2O$, wherein $R_2O$ consists of one or more alkali metal oxides selected in amounts not exceeding the indicated proportion from the group consisting of up to 35% $Na_2O$, up to 30% $K_2O$, and up to 15% $Li_2O$, up to 25% total of metal oxides selected from the group consisting of ZnO and MnO, up to 15% $SiO_2$, and up to 10% F wherein the summation of the weight percentages of the foregoing constituents total substantially 100% of said composition.

2. An article in accordance with claim 1 wherein the surface barrier layer consists essentially of an aluminoborate glass-ceramic coating having a composition, in weight percent, of about 10-55% $Al_2O_3$, 4-40% $B_2O_3$, up to 70% total of RO, wherein RO consists of one or more alkaline earth metal oxides selected in amounts not exceeding the indicated proportions from the group consisting of up to 70% BaO, up to 60% SrO, up to 40% CaO, and up to 25% MgO, up to 25% total of metal oxides selected from the group consisting of ZnO and MnO, up to 15% $SiO_2$, and up to 10% F, said composition being essentially alkali-free.

3. An article in accordance with claim 2 wherein the glass ceramic coating has a $B_2O_3$ content in the range of about 4-25% by weight.

4. An article in accordance with claim 1 wherein the substrate is selected from the group consisting of carbon, intermetallic aluminides, and refractory metal alloys.

5. An article in accordance with claim 4 wherein the substrate is an intermetallic titanium aluminide.

6. An article in accordance with claim 4 wherein the substrate is a titanium alloy.

7. An article in accordance with claim 4 wherein the substrate is a cobalt-based, nickel-based, or iron-based superalloy.

8. An article in accordance with claim 4 wherein the substrate is a carbon-fiber-reinforced carbon matrix composite.

9. An article in accordance with claim 4 wherein the substrate is a carbon-fiber-reinforced carbon matrix composite provided with a primer coating of silicon carbide.

10. An article in accordance with claim 1 wherein the aluminoborate glass-ceramic coating is provided with a refractory ceramic overcoating.

11. An article in accordance with claim 10 wherein the refractory ceramic overcoating is selected from the group consisting of cordierite, alumina, zirconia, and refractory aluminosilicates.

* * * * *